United States Patent Office 3,825,525
Patented July 23, 1974

3,825,525
ALLERGENS REACTED WITH CARBODIIMIDES
Noel Austin Mullan and Brian George Overell, Dorking, England, assignors to Beecham Group Limited, Brentford, Middlesex, England
No Drawing. Original application July 30, 1970, Ser. No. 59,745. Divided and this application July 20, 1973, Ser. No. 381,172
Claims priority, application Great Britain, Aug. 6, 1969, 39,289/69; May 15, 1970, 23,621/70; May 16, 1970, 23,853/70
Int. Cl. A61k 23/00; C07g 7/00
U.S. Cl. 260—112 R
21 Claims

ABSTRACT OF THE DISCLOSURE

Desensitizing or immunizing agents are provided for treating hypersensitive or allergic conditions. Modified allergenic material is prepared comprising an allergenic protein or glycoprotein crosslinked intermolecularly or intramolecularly with an inorganic cyanate. The modified material has reduced allergenicity relative to the uncrosslinked allergen and has the ability to produce antibodies having cross-specificity for the uncrosslinked allergenic protein or glycoprotein.

---

This is a division of application Ser. No. 59,745 filed July 30, 1970.

The present invention relates to desensitizing or immunizing agents useful in the treatment of hypersensitive or allergic conditions, and to a method for their preparation.

It is well known that some individuals are allergic or hypersensitive to certain allergenic materials such as pollens, house dust, cat fur, cereals and a host of other common substances. Such individuals can suffer acute discomfort as a result of their allergic conditions which may manifest themselves in such diseases as asthma, hay fever, eczema, dermatitis and migraine. Consequently work continues to find suitable treatments which will alleviate the suffering of the allergic patient.

One technique which has been used in the past in the treatment of allergic conditions is the so-called "desensitization" therapy. The patient undergoing such therapy is administered repeated gradually increasing doses of an extract of the particular allergenic material or materials to which he is sensitive. At the end of a course of treatment the patient's natural resistance to the allergen is usually greatly enhanced, presumably as a result of the build-up of antibodies in his body, stimulated by the administered extract.

As will be appreciated, this desensitization thereapy suffers from certain disadvantages, not the least of which lies in the possibilities that a dangerously high dose of allergen may inadvertently be administered, resulting in a general anaphylactic reaction in the patient. It has been suggested that this problem would be overcome if it were possible to modify the allergenic materials in such a way that their allergenicity is reduced relative to their desensitizing and/or immunizing properties. In other words, if the allergenic material could be rendered harmless, or at least less harmful to the sensitive patient, while at the time retaining its ability to stimulate antibody production, one of the main disadvantages of desensitization therapy could be removed.

According to the present invention there is provided a process for the preparation of a modified allergenic material, which process comprises the reaction of an allergenic material with a polyaldehyde, a polyketone, a carbodiimide, an epihalohydrin or an inorganic cyanate, with the proviso that when an inorganic cyanate is employed the reaction is carried out under acid conditions.

The allergenic starting material which is modified according to the process of this invention may be obtained from an allergen-containing substance such as pollen by extracting the allergen-containing substance with a suitable solvent, usually aqueous, in a known manner. The allergenic extract obtained in this way consists principally of protein or glycoprotein, usually contaminated with free carbohydrate. The allergenic extract is then usually purified by removing some of the contaminants, e.g. by dialysis, precipitation or gel filtration, and the resulting purified allergenic material may then be treated according to the process of the invention. A fuller description of some of the techniques available can be found in an article by J. N. Newell in the Journal of Allergy, Vol. 13, 1942, pages 177 to 203, particularly page 187. In another useful extraction procedure, the allergen-containing material or an aqueous extract thereof is treated with aqueous phenol and the allergenic extract is recovered from the phenol phase.

The polyaldehyde and polyketone reagents which lie within the scope of this invention include dialdehyde and diketones as well as the higher aldehyde and ketones. Generally of the polyketones and polyaldehydes which may be used we prefer to use dialdehydes, e.g. those having from 2 to about 24 carbon atoms in the molecule. The dialdehyde may be aliphatic, cycloaliphatic, heterocyclic or aromatic, and may have either a straight or branched chain structure, e.g. glyoxal, 1,3-propanedial, 1,4-butanedial, glutaraldehyde and $\alpha,\omega$-dialdehydes having from 14 to 24 carbon atoms in the molecule. A particularly preferred dialdehyde is glutaraldehyde.

The term "carbodiimide" as used in the present specification refers to compounds of formula (I) and salts thereof:

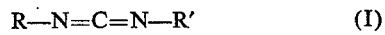

$$R-N=C=N-R' \qquad (I)$$

wherein R and R' are the same or different and each is an aliphatic, aromatic or heterocyclic radical. The preferred carbodimides for use in the present invention are water-soluble, e.g. 1-cyclohexyl-3-(2-morpholinoethyl) carbodiimide metho-p-toluenesulphonate.

As used herein the term "epihalohydrin" refers to compounds of formula (II):

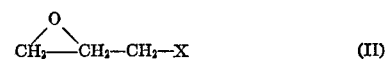

(II)

wherein X is a halogen atom, particularly bromine or chlorine. We find that good results are obtained with epichlorohydrin.

As examples of inorganic cyanate ion reagents may be mentioned the alkali metal cyanates, particularly potassium cyanate; and the alkaline earth metal cyanates.

As a general rule, allergenic proteins are fairly resistant to denaturation and can usually be heated to relatively high temperatures without denaturation taking place. The process of this invention can thus take place over a wide range of temperatures although in practice it will generally not be necessary or desirable to exceed a temperature of about 100° C. When dialdehydes are employed it is preferred to operate at a temperature below 37° C., and in practice we prefer to carry out the reaction at room temperature in each case, i.e. about 20°-25° C. When employing dialdehydes, exteme reaction conditions should be avoided in order to reduce undesirable byproducts such as are produced by self condensation of the aldehydes.

In the case of polyaldehydes and polyketones, the pH that which the process of this invention should be carried out is not critical. A suitable pH range is from about 4 to about 8, with a pH of about 5 being preferred. Very low pH values should be avoided in order to reduce possible self condensation of the aldehydes.

Similarly in the case of epihalohydrin and carbodiimides, the reaction can be carried out at any convenient pH, although we prefer to avoid extremes of pH. For the epihalohydrin the reaction proceeds smoothly at alkaline pH's, suitably at about pH 8. In the case of the carbodiimide, the reaction is preferably carried out at acid pH's, suitably at pH about 5.

The reaction of the allergenic protein with an inorganic cyanate reagent in the process of this invention must be carried out at acid pH's preferably at a pH of about 5.

The reagents used in the process of this invention are believed to act as cross-linking agents for the allergenic material, forming inter- and/or intra-molecular links. Thus, although the allergenic starting materials are water-soluble, the modified allergenic products of the present invention are usually only sparingly soluble. The solubility of the modified allergenic materials appears to be dependent on the extent of cross-linking, which in turn may vary according to such factors as the nature and quantity of reagent used and the reaction conditions. We are not aware of any empirical method of determining in advance the solubility characteristics of the modified allergenic products and consequently the reaction variables necessary to obtain a product having the desired solubility must be determined by trial and error. This is a matter of routine, however, and should present little difficulty to those skilled in the art.

In another embodiment of this invention there is provided a pharmaceutical preparation comprising the modified allergenic material prepared by the process described above, and a parenterally acceptable carrier. Suitable carriers include isotonic salt or buffer solutions, oily carriers and other materials well known in the art. If desired an adjuvant such as tyrosine, alumina, aluminium hydroxide or aluminium phosphate, may be included.

The modified allergenic material is generally administered by subcutaneous injection. Dosage rates will vary according to the allergic condition of the patient.

Generally, in preparing pharmaceutical compositions in accordance with this invention, the modified allergenic material should be one which has a reduced solubility relative to the starting material, but which is sufficiently soluble *in vivo* to provide the desired release characteristics. We find that one way of achieving this is to use a sparingly soluble modified allergen absorbed on alumina and like materials. The degree of solubility of the cross-linked allergenic material is modified by absorption onto the alumina and the optimum *in vivo* release characteristics can be achieved by routine experimentation.

On parenteral administration to animals of the modified allergenic materials of this invention, it has been found that appreciable levels of circulating antibody are formed, the antibody having cross-specificity for the unmodified allergenic material. The modified materials tested did not cause any anaphylactic reaction in hypersensitive animals.

EXAMPLE 1

Preparation of Insoluble Allergen Derivative With Glutaraldehyde

A partially purified extract of Cocksfoot pollen, containing 10 mg. protein/ml. in 0.1M sodium acetate buffer pH 5.3 (5 ml.), was treated with 0.5% glutaraldehyde solution (5 ml.), and stirred at room temperature for 30 minutes. The precipitate which formed was removed by centrifugation and washed with distilled water to remove residual soluble material. It was finally suspended in phenol-saline solution for storage.

Test of Allergenicity

The suspension of insolubilized pollen at a concentration of 10 mg./ml. was pricked into the skin of grass-sensitive allergic patients. At the same time the starting material and phenol-saline solution respectively were pricked into other areas of skin of the same patients. Weal areas were measured after 10 minutes, and are expressed in Table I in sq. mm. It can be seen that insolubilized material at 200 times the concentration of starting material has barely one tenth of its allergenicity: the retained allergenicity is thus negligible when compared with that of the starting material.

Test of Immunogenicity

The insolubilized material and the starting material respectively were emulsified in Freund's complete adjuvant to give concentrations of 1 mg./ml. Groups of guinea-pigs were injected subcutaneously with one or other of the emulsions (0.5 ml.). After 22 days the animals were clipped free of hair on the flanks and a series of intradermal injections (0.1 ml.) of a serial dilution of purified Cocksfoot pollen extract was made into the clipped areas. A 5% solution of Pontamine Sky Blue (0.4 ml.) was immediately injected intravenously. After 20 minutes weal diameters were measured, and are recorded in Table II.

It can be seen that not only does the glutaraldehyde-treated material produce antibody which reacts with the starting material, but it is a more efficient immunizer than the starting material.

TABLE 1

| Patient number | Insolubilized cocksfoot pollen extract, 10 mg./ml. | Purified cocksfoot extract, 50 µg./ml. | Phenol-saline |
| --- | --- | --- | --- |
| 1 | 21 | 84 | 12 |
| 2 | 16 | 32 | 9 |
| 3 | 13 | 57 | 23 |
| 4 | 15 | 51 | 4 |
| Total | 65 | 224 | 48 |
| Total less that for phenolsaline | 17 | 176 | |

TABLE II

| Guinea pig number | Immunizing material (0.5 mg.) | Weal diameter (mm.) for quantity of cocksfoot pollen extract injected intradermally | | | | | |
| --- | --- | --- | --- | --- | --- | --- | --- |
| | | 100 µg. | 10 µg. | 1 µg. | 0.1 µg. | 0.01 µg. | 0.001 µg |
| 1 | Purified cocksfoot pollen extract. | 15 | 0 | 0 | 0 | 0 | 0 |
| 2 | | 16 | 0 | 0 | 0 | 0 | 0 |
| 3 | | 17 | 0 | 0 | 0 | 0 | 0 |
| 4 | | 16 | 0 | 0 | 0 | 0 | 0 |
| 5 | | 14 | 0 | 0 | 0 | 0 | 0 |
| 6 | Glutaraldehyde-treated cocksfoot pollen extract. | 12 | 10 | 9 | 0 | 0 | 0 |
| 7 | | 14 | 13 | 12 | 12 | 10 | 8 |
| 8 | | 16 | 14 | 12 | 11 | 10 | 8 |
| 9 | | 12 | 10 | 0 | 0 | 0 | 0 |
| 10 | | 12 | 9 | 0 | 0 | 0 | 0 |

EXAMPLE 2

Preparation of Carbodiimide-Treated Allergen

Fifty mg. of material which had been extracted from mixed grass pollens, and which had been partially purified by treatment with aqueous phenol and subsequent precipitation of protein from the phenol phase, so as to remove much of the carbohydrate and low molecular weight material, was dissolved in 5 ml. of 0.5M borate buffer, pH 8.85. 5 ml. of a 2% solution of 1-cyclohexyl-3-(2-morpholinoethyl) carbodiimide metho-p-toluenesulphonate was added slowly, and the solution was stirred at room temperature overnight. The precipitate which formed was then centrifuged off, washed three times with borate buffer, and suspended in phenol saline.

Test of Allergenicity

A suspension of the test material and a solution of the starting material, both in phenol-saline, and the medium itself, were respectively pricked into the skin of grass sensitive allergic patients. Weal areas were measured after 10 minutes.

The results of the allergenicity test are shown in Table III:

TABLE III

| Patient number | Mixed grass pollen extract, 50 μg./ml. | Carbodiimide-treated mixed grass pollen extract | Phenol saline |
|---|---|---|---|
| 1 | 12 | 0 | 0 |
| 2 | 3 | 2 | 0 |
| 3 | 8 | 0 | 0 |
| 4 | 12 | 0 | 0 |
| 5 | 15 | 0 | 0 |
| 6 | 62 | 3 | 0 |
| Total | 112 | 5 | 0 |

Note.—Figures indicate weal areas (sq. mm.).

Test of Immunogenicity

Replicate guinea pigs were immunized by subcutaneous injection of an emulsion containing the test material in Freund's complete adjuvant. A similar set of guinea pigs were immunized with the unmodified starting material adjuvanted in the same way. After 21–8 days the animals were clipped free of hair on the flanks and a series of intradermal injections (0.1 ml.) of a serial dilution of startnig material terminating with normal saline was made into the clipped area.

A 5% solution of Pontamine Sky Blue (0.4 ml.) was immediately injected intravenously. After 20 minutes blue-colored weals formed at some of the sites of intradermal injection, indicating the presence of antibody with specificity for the starting material. Weal Diameters were measured and recorded.

The results of the immunogenicity tests are recorded in Table IV:

TABLE IV

| Guinea pig number | Immunizing material, 5 mg. | Weal diameter (mms.) for quantity of mixed grass pollen extract injected intradermally | | | | | |
|---|---|---|---|---|---|---|---|
| | | 110 μg. | 10 μg. | 1 μg. | 0.1 μg. | 0.01 μg. | 0.001 μg. |
| 1 | Mixed grass pollen extract. | 14 | 12 | 10 | 9 | 8 | 8 |
| 2 | | 14 | 13 | 10 | 9 | 8 | |
| 3 | | 16 | 14 | 12 | 10 | 9 | 9 |
| 4 | | 14 | 13 | 10 | | | |
| 5 | Carbodiimide-treated mixed grass pollen extract. | 14 | 12 | 10 | 10 | 9 | |
| 6 | | 12 | 10 | | | | |
| 7 | | 12 | 10 | 9 | 9 | 9 | |
| 8 | | | | | | | |

It can be seen from the results shown in Tables III and IV that higher levels of antibody were produced by immunization with the carbodiimide modified allergen, but that the allergenicity of the material was negligible.

EXAMPLE 3

50 mg. of material which had been extracted from mixed grass pollens, and which had been partially purified so as to remove much of the carbohydrate and low molecular weight material, was dissolved in 5 ml. of 0.01 M phosphate buffer ph 8.0. 1 ml. of 1-chloro-2:3-epoxypropane was added slowly and the mixture was stirred overnight at room temperature. The precipitate which formed was centrifuged off, washed with phosphate buffer, and suspended in phenol saline.

Test of Allergenicity

A suspension of the test material and a solution of the starting material, both in phenol-saline, and the medium itself, were respectively pricked into the skin of grass sensitive allergic patients. Weal areas were measured after 10 minutes. The results of the test of allergenicity are shown in Table V:

TABLE V

| Patient number | Mixed grass pollen extract, 50 μg./ml. | Epichlorhydrin-treated mixed grass pollen extract, 1 mg./ml. | Phenol saline |
|---|---|---|---|
| 1 | 62 | 0 | 0 |
| 2 | 15 | 1 | 0 |
| 3 | 12 | 0 | 0 |
| 4 | 8 | 2 | 0 |
| 5 | 3 | 0 | 0 |
| 6 | 12 | 0 | 0 |
| Total | 112 | 3 | 0 |

Note.—Figures indicate weal areas (sq. mm.).

Test of Immunogenicity

Replicate guinea pigs were immunized by subcutaneous injection of an emulsion containing the test material in Freund's complete adjuvant. A similar set of guinea pigs were immunized with the unmodified starting material adjuvanted in the same way. After 21–8 days the animals were clipped free of hair on the flanks and a series of intradermal injections (0.1 ml.) of a serial dilution of starting material terminating with normal saline was made into the clipped area.

A 5% solution of Pontamine Blue Sky (0.4 ml.) was immediately injected intravenously. After 20 minutes blue-colored weals formed at some of the sites of intradermal injection, indicating the presence of antibody with specificity for the starting material. Weal diameters were measured and recorded. The results of the test of immunogenicity are shown in Table VI:

TABLE VI

| Guinea pig number | Immunizing material | Weal diameter (mms.) for quantity of mixed grass pollen extract injected i.d. | | | | | |
|---|---|---|---|---|---|---|---|
| | | 100 μg. | 10 μg. | 1 μg. | 0.1 μg. | 0.01 μg. | 0.001 μg. |
| 1 | Mixed grass pollen extract (5 mg.). | 14 | 13 | 10 | | | |
| 2 | | 16 | 14 | 12 | 10 | 9 | 9 |
| 3 | | 14 | 13 | 10 | 9 | 8 | |
| 4 | | 14 | 12 | 10 | 9 | 8 | 8 |
| 5 | Epichlorhydrin-treated mixed grass pollen extract (5 mg.). | 12 | 10 | | | | |
| 6 | | 10 | | | | | |
| 7 | | | | | | | |
| 8 | | 10 | | | | | |
| 9 | | 12 | 9 | | | | |
| 10 | Mixed grass pollen extract (0.5 mg.). | 14 | 12 | 9 | | | |
| 11 | | 12 | 11 | 9 | | | |
| 12 | | 14 | 12 | 9 | | | |
| 13 | Epichlorhydrin-treated grass pollen extract (0.5 mg.). | 10 | 8 | | | | |
| 14 | | | | | | | |
| 15 | | 10 | 8 | | | | |
| 16 | | | | | | | |

It can be seen from the above results that detectable levels of antibody were produced by immunization with epichlorhydrin-treated allergens while the allergenicity was reduced to a negligible level.

EXAMPLE 4

50 mg. of material which had been extracted from Cocksfoot grass pollen was dissolved in 10 ml. of 0.01M ph 8.0. 1 ml. of 1-bromo-2:3 epoxypropane was added slowly and the mixture was stirred overnight at room temperature. The precipitate which formed was centrifuged off, washed with phosphate buffer, and suspended in phenol saline.

Results of the biological testing are shown in Tables III and IV. The testing procedures were identical with those of Example 3. Detectable levels of antibody were produced by immunization, while allergenicity was reduced to negligible levels.

TABLE VII.—IMMUNOGENICITY OF EPIBROMOHYDRIN-TREATED ALLERGEN

| Guinea pig number | Immunizing material | Weal diameter (mm.) for quantity of cocksfoot pollen extract injected i.d. | | | | | |
|---|---|---|---|---|---|---|---|
| | | 100 μg. | 10 μg. | 1 μg. | 0.1 μg. | 0 01 μg. | 0.001 μg. |
| 1 | Cocksfoot pollen extract (0.5 mg.). | 16 | 10 | | | | |
| 2 | | 16 | 10 | | | | |
| 3 | | 16 | 10 | | | | |
| 4 | Epibromohydrin treated cocksfoot extract (0.5 mg.). | 14 | 10 | | | | |
| 5 | | 14 | 10 | | | | |
| 6 | | 15 | 10 | | | | |

TABLE VIII.—ALLERGENICITY OF EPIBROMOHYDRIN-TREATED ALLERGEN

| Patient number | Cocksfoot extract, 100 μg./ml. | Epibromohydrin-treated cocksfoot pollen extract, 100 μg./ml. | Phenol saline |
|---|---|---|---|
| 1 | 9 | 0 | 0 |
| 2 | 18 | 0 | 0 |
| 3 | 22 | 0 | 0 |
| 4 | 21 | 0 | 0 |
| Total | 70 | 0 | 0 |

EXAMPLE 5

Preparation of Cyanate-Modified Allergen

An aqueous extract of mixed grass pollens (Bent, Broom, Cocksfoot, Dogstail, False Cat, Fescue, Foxtail, Meadow Rye, Timothy Vernal and Yorkshire Fog) was partially purified by treatment with aqueous phenol followed by precipitation of protein from the phenol phase to remove much of the carbohydrate and the low molecular weight materials. 50 mg. of the resultant partially purified allergenic protein was dissolved in 5 ml. of water and the pH adjusted to pH 8 by the addition of sodium hydroxide solution. The pH was then further adjusted 5.0 with acetic acid, 0.2 g. of potassium cyanate was added, and the mixture stirred at room temperature overnight. The precipitate which formed was washed repeatedly with phosphate buffer at pH 8 and then suspended in phenol saline.

Test of Allergenicity

A suspension of the cyanate-modified allergen prepared as above, a suspension of the unmodified partially purified allergen extract (both in phenol saline) and the phenolsaline medium itself were respectively pricked into the skin of grass-sensitive allergic patients. Weal areas were measured after ten minutes and are expressed in Table XVII in sq. mm. It can be seen that the cyanate modified allergen exhibits negligible allergenicity relative to the unmodified material.

TABLE IX

| Patient number | Mixed grass pollen extract, 50 μg./ml. | Cyanate-treated grass pollen extract, 1 mg./ml. | Phenol saline |
|---|---|---|---|
| 1 | 12 | 4 | 0 |
| 2 | 3 | 2 | 0 |
| 3 | 8 | 6 | 0 |
| 4 | 12 | 3 | 0 |
| 5 | 15 | 5 | 0 |
| 6 | 62 | 24 | 0 |
| Total | 112 | 44 | 0 |

Test of Immunogenicity

Replicate guinea pigs were immunized by subcutaneous injection of an emulsion containing the cyanate-modified allergen in Freund's complete adjuvant. A similar set of guinea pigs were immunized with the unmodified starting material adjuvanted in the same way. After 21–28 days both sets of animals were clipped free of hair on the flanks and a series of intradermal injections (0.1 ml.) of a serial solution of the starting material terminating with normal saline was made into the clipped area.

A 5% solution of Pontamine skyblue (0.4 ml.) was immediately injected intravenously. After 20 minutes blue-colored weals formed and some of the sites of intradermal injection, indicating the presence of antibody with specificity for the starting material. Again weal diameters were measured and are recorded in Table X. It can be seen that the cyanate modified allergen retains the immunizing specificity of the starting material.

TABLE X

| Guinea pig number | Immunizing material | Weal diameter (mms.) for quantity of mixed grass pollen extract injected i.d. | | | | | |
|---|---|---|---|---|---|---|---|
| | | 100 μg. | 10 μg. | 1 μg. | 0.1 μg. | 0.01 μg. | 0.001 μg. |
| 1 | Mixed grass pollen extract (5 mg.). | 14 | 12 | 10 | 9 | 8 | 8 |
| 2 | | 14 | 13 | 10 | 9 | 8 | |
| 3 | | 16 | 14 | 12 | 10 | 9 | 9 |
| 4 | | 14 | 13 | 10 | | | |
| 5 | Cyanate-treated mixed grass pollen extract (5 mg.). | 12 | 9 | 7 | | | |
| 6 | | 12 | 9 | 7 | | | |
| 7 | | 10 | | | | | |
| 8 | | 12 | | | | | |
| 9 | Mixed grass pollen extract (0.5 mg.). | 14 | 12 | 9 | | | |
| 10 | | 12 | 11 | 9 | | | |
| 11 | | 14 | 12 | 9 | | | |
| 12 | | 12 | 9 | | | | |

EXAMPLE 6

In order to obtain confirmation of the biological testing results the procedure of Example 5 was repeated. The results of the test of the allergenicity of the modified allergen are recorded in Table XI and the results of the tests of the immunogenicity of the cyanate-modified allergen are recorded in Table XII.

TABLE XI

| Patient number | Mixed grass pollen extract, 100 μg./ml. | Cyanate-treated mixed grass pollen extract, 2 mg./ml. | Phenol saline |
|---|---|---|---|
| 1 | 23 | 1 | 1 |
| 2 | 6 | 0 | 0 |
| 3 | 2 | 0 | 0 |
| 4 | 19 | 0 | 0 |
| Total | 50 | 1 | 1 |

NOTE.—Figures indicate weal areas (sq. mm.).

TABLE XII

| Guinea pig number | Immunizing material | Weal diameter (mms.) for quantity of mixed grass pollen extract injected i.d. | | | | | |
|---|---|---|---|---|---|---|---|
| | | 100 μg. | 10 μg. | 1 μg. | 0.1 μg. | 0.01 μg. | 0.001 μg. |
| 1 | Mixed grass pollen extract (5 mg.). | 12 | 10 | 9 | 8 | | |
| 2 | | 12 | 10 | 7 | | | |
| 3 | | 12 | 10 | 8 | | | |
| 4 | | 12 | 10 | 9 | | | |
| 5 | Cyanate-treated mixed grass pollen extract (5 mg.). | 12 | 10 | | | | |
| 6 | | 12 | 9 | | | | |
| 7 | | 14 | 12 | 9 | | | |
| 8 | | 14 | 10 | | | | |
| 9 | Mixed grass pollen extract (0.5 mg.). | 14 | 10 | | | | |
| 10 | | 12 | 11 | 9 | | | |
| 11 | | 10 | 9 | | | | |
| 12 | | | | | | | |
| 13 | Cyanate-treated mixed grass pollen extract (0.5 mg.). | 12 | 11 | 8 | | | |
| 14 | | 12 | | | | | |
| 15 | | 10 | | | | | |
| 16 | | | | | | | |

EXAMPLE 7

Treatment of Pollen Extract With Phenyl Glyoxal

Method: A 3% solution of phenylglyoxal hydrate dissolved in 0.01M phosphate buffer, pH 8, was added to an equal volume of 50 mg. of material which had been extracted from Cocksfoot pollen and which, after purification by treatment with phenol, was dissolved in the same buffer. The recation was carried out at room temperature for 24 hours. The precipitate which formed was washed repeatedly with phosphate buffer at pH 8 and then suspended in phenol saline Test of Allergenicity: A suspension of the phenylglyoxal-modified material prepared as above, a suspension of the unmodified phenol treated Cocksfoot extract (both in phenol-saline) and the phenol-saline medium itself were respectively pricked into the skin of grass-sensitive allergic patients. Weal areas were measured after ten minutes and are expressed in Table XIII in sq. mm.

TABLE XIII

| Patient number | Cocksfoot pollen extract, 50 μg./ml. | Phenyl-glyoxal-treated extract, 1 mg./ml. | Phenol saline |
|---|---|---|---|
| 1 | 35 | 0 | 0 |
| 2 | 27 | 4 | 0 |
| 3 | 19 | 2 | 1 |
| Total | 91 | 6 | 1 |

Test of immunogenicity: Replicate guinea pigs were immunized by subcutaneous injection of an emulsion containing the phenylglyoxal modified material in Freund's complete adjuvant. A similar set of guinea pigs were immunized with the unmodified starting material adjuvanted in the same way. After 28 days, both sets of animals were clipped free of hair on the flanks and a series of intradermal injections (0.1 ml.) of a serial solution of the starting material terminating with normal saline was made into the clipped area. A 5% solution of Pontamine sky blue (0.4 ml.) was immediately injected intravenously. After 20 minutes blue colored weals formed at some of the sites of intradermal injection, indicating the presence of antibody with specificity for the starting material. Weal areas were measured and are recorded in Table XIV.

TABLE XIV

| Guinea pig number | Immunizing material | Weal diameter (mm.) for quantity of Cocksfoot pollen extract injected i.d. | | | | | |
|---|---|---|---|---|---|---|---|
| | | 100 μg. | 10 μg. | 1 μg. | 0.1 μg. | 0.01 μg. | 0.001 μg. |
| 1 | Cockfoot pollen extract (5 mg.). | 14 | 14 | 11 | 10 | 9 | 7 |
| 2 | | 14 | 12 | 8 | 7 | 6 | |
| 3 | | 12 | 11 | 10 | 9 | 7 | |
| 4 | | 12 | 11 | 9 | 9 | 8 | |
| 1 | Phenylglyoxal treated cocksfoot pollen extract (0.5 mg.). | 12 | 11 | | | | |
| 2 | | 13 | 10 | | | | |
| 3 | | 12 | | | | | |
| 4 | | | | | | | |

EXAMPLE 8

Treatment of Pollen Extract with Glutaraldehyde and Subsequent Absorption Into Aluminium Hydroxide Method: 1 ml. of 5% glutaraldehyde solution was added to 9 ml. of an aqueous extract of timothy pollen containing 1 mg./ml. at pH 5.3. The mixture was stirred at room temperature for 3 days. 6 ml. of 2% aluminium hydroxide solution were added and the mixture stirred for one hour. After centrifugation the precipitate was washed twice in 0.01M phosphate buffer pH 8 and three times in distilled water and finally resuspended to a concentration of 1 mg./ml. pollen in phenol saline. The procedure was repeated without the addition of glutaraldehyde, the final suspension serving as a control in the immunizing specificity test.

Test of allergenicity: A suspension of the above material, a solution of the unmodified pollen extract (both in phenol-saline) and the phenol saline medium itself were respectively pricked into the skin of grass-sensitive allergic patients. Weal areas were measured after 10 minutes and are expressed in Table XV in sq. mm.

TABLE XV

| Patient number | Timothy pollen aqueous extract, 50 μg./ml. | Alumina adsorbed glutaraldehyde treated Timothy pollen extract, 1 mg./ml. | Alumina adsorbed untreated Timothy pollen extract, 1 mg./ml. | Phenol saline |
|---|---|---|---|---|
| 1 | 17 | 2 | 6 | 0 |
| 2 | 2 | 0 | 3 | 0 |
| 3 | 6 | 0 | 3 | 0 |
| Total | 25 | 2 | 12 | 0 |

Test of immunizing specificity: Replicate guinea pigs were immunized by subcutaneous injection of the alumina-glutaraldehyde adsorbed modified material. A similar set of guinea pigs were immunized with unmodified alumina-adsorbed timothy pollen extract at a pollen concentration of 1 mg./ml. 21 days later a repeat injection was given and the animals bled 10 days later.

Passive cutaneous anaphylaxis was carried out on the sera by injection of ser ial dilutions intradermally into a clipped area on the flanks of a set of guinea pigs. The pigs were then challenged intravenously with the unmodified aqueous timothy extract, containing 0.4 ml. Pontamine sky blue solution, five hours later. Results obtained with different concentrations of challenging antigen are shown in Table XVIII for the modified material and Table XVII for the control suspension without glutaraldehyde.

TABLE XVI

| Guinea pig number | Challenge freeze-dried aqueous Timothy pollen extract, mg./ml. | Weal diameters in mm. at serum dilution of— | | | | | |
|---|---|---|---|---|---|---|---|
| | | 1/5 | 1/25 | 1/125 | 1/625 | 1/3125 | Saline |
| 1 | 1 | 22 | 20 | 16 | 10 | | |
| 2 | 100 | 20 | 17 | 13 | | | |
| 3 | 10 | 20 | 18 | | | | |
| 4 | 5 | 14 | | | | | |

TABLE XVII

| Guinea pig number | Challenge freeze-dried aqueous Timothy pollen extract, mg./ml. | Weal diameters in mm. at serum dilution of— | | | | | |
|---|---|---|---|---|---|---|---|
| | | 1/5 | 1/25 | 1/125 | 1/625 | 1/3125 | Saline |
| 5 | 1 | 25 | 16 | | | | |
| 6 | 100 | 20 | 18 | 16 | | | |
| 7 | 10 | | | | | | |
| 8 | 5 | | | | | | |

It can be seen that treatment with glutaraldehyde leads to enhanced antibody formation when compared with that from untreated material, although allergenic activity was reduced.

We claim:

1. A process for the preparation of a modified allergenic material from pollen and house dust which comprises reacting an allergenic extract of pollen or house dust which consists principally of a protein or glycoprotein with a carbodiimide at an acidic pH to reduce the allergenicity and recovering the modified allergenic material so produced.

2. A process according to claim 1 wherein the temperature is below 100° C.

3. A process according to claim 1 wherein the pH is about 5.

4. A process according to claim 2 wherein the temperature is room temperature.

5. A process according to claim 1 wherein the carbodiimide is of the formula $$R-N=C=N-R'$$

or a salt thereof
wherein R and R' are the same or different and are each an aliphatic, aromatic or heterocyclic moiety.

6. A process according to claim 1 wherein the carbodiimide is water-soluble.

7. A process according to claim 1 wherein the carbodiimide is 1-cyclohexyl-3-(2-morpholinoethyl) carbodiimide metho-p-toluenesulphonate.

8. A process according to claim 1 wherein the allergenic extract is a pollen extract.

9. A process according to claim 1 wherein the allergenic extract is a house dust extract.

10. A process according to claim 8 wherein the pollen is Cocksfoot pollen.

11. A process according to claim 8 wherein the pollen is mixed grass pollens.

12. A process according to claim 8 wherein the pollen is timothy pollen.

13. A modified allergenic material which comprises an allergenic extract of pollen or house dust which consists principally of a protein or glycoprotein, which allergenic extract is crosslinked inter- or intra-molecularly with a carbodiimide, said modified allergenic material being substantially water-insoluble or only sparingly water-soluble and having a reduced allergenicity relative to the uncrosslinked protein or glycoprotein and having the ability to stimulate the production of antibodies having cross-specificity for the unlinked protein or glycoprotein.

14. A modified allergenic material according to claim 13 wherein the allergenic extract is a pollen extract.

15. A modified allergenic material according to claim 13 wherein the allergenic extract is a house dust extract.

16. A modified allergenic material according to claim 13 wherein the carbodiimide is of the formula $$R-N=C=N-R'$$

or a salt thereof
wherein R and R' are the same or different and are each an aliphatic, aromatic or heterocyclic moiety.

17. A modified allergenic material according to claim 13 wherein the carbodiimide is water-insoluble.

18. A modified allergenic material according to claim 13 wherein the carbodiimide is 1-cyclohexyl-3-(2-morpholinoethyl) carbodiimide metho-p-toluenesulphonate.

19. A modified allergenic material according to claim 14 wherein the pollen is Cocksfoot pollen.

20. A modified allergenic material according to claim 14 wherein the pollen is mixed grass pollens.

21. A modified allergenic material according to claim 14 wherein the pollen is timothy pollen.

References Cited
UNITED STATES PATENTS 2,938,892   5/1960   Sheehan _____ 260—112

OTHER REFERENCES

Chem. Abstracts, Vol. 73, 1970, Overell 7260a.

HOWARD E. SCHAIN, Primary Examiner

UNITED STATES PATENT OFFICE
CERTIFICATE OF CORRECTION

Patent No. 3,825,525　　　　　　　　　Dated July 23, 1974

Inventor(s) Noel Austin Mullan et al.

It is certified that error appears in the above-identified patent and that said Letters Patent are hereby corrected as shown below:

IN THE ABSTRACT OF THE DISCLOSURE

Column 1, line 20, change "an inorganic cyanate" to -- a carbodiimide --.

Signed and sealed this 26th day of November 1974.

(SEAL)
Attest:

McCOY M. GIBSON JR.　　　　　　　　C. MARSHALL DANN
Attesting Officer　　　　　　　　　Commissioner of Patents